United States Patent [19]

Schuler

[11] Patent Number: 5,509,407
[45] Date of Patent: Apr. 23, 1996

[54] FIRST STAGE PRESSURE REGULATOR WITH FLOW AROUND SEAT

[76] Inventor: Manfred Schuler, 17462 Wayne Ave., Irvine, Calif. 92714

[21] Appl. No.: 258,093

[22] Filed: Jun. 10, 1994

[51] Int. Cl.$^6$ ...................................................... A62B 7/04
[52] U.S. Cl. .............................. 128/205.24; 128/204.26; 137/505.25; 137/550
[58] Field of Search .......................... 128/205.24, 204.26, 128/201.28, 205.22; 137/505.25, 550; 251/118; 138/44

[56] References Cited

U.S. PATENT DOCUMENTS

| | | | |
|---|---|---|---|
| 4,230,140 | 10/1980 | Hart | 137/81.2 |
| 4,436,090 | 3/1984 | Darling | 128/204.26 |
| 4,898,205 | 2/1990 | Ross | 137/505.25 |
| 4,986,312 | 1/1991 | Gute | 138/44 |
| 5,190,030 | 3/1993 | Semeia | 128/204.26 |
| 5,331,955 | 7/1994 | Lewis | 128/200.24 |
| 5,368,022 | 11/1994 | Wagner | 137/505.25 |
| 5,379,761 | 1/1995 | Schuler | 128/204.26 |
| 5,381,825 | 1/1995 | Garraffa | 137/505.25 |

*Primary Examiner*—Edgar S. Burr
*Assistant Examiner*—William S. Deane, Jr.
*Attorney, Agent, or Firm*—Walter A. Hackler

[57] ABSTRACT

A first stage pressure regulator for use with a high pressure source of breathable gas includes a housing and means for attaching the housing to a high pressure source of breathable gas. A pressure regulated outlet is provided and a valve seat member fixed within the housing includes a central seating surface perpendicularly disposed to a longitudinal axis of the valve seat member. The perimeter of the valve seat member is shaped to enable the breathable gas to pass parallel to the valve seat member longitudinal axis in order to enable the high pressure source to be connected coaxially with the first stage pressure regulator. A piston is provided which includes a hollow center in fluid communication with the pressure regulated outlet. An open end of the piston is provided for sealing the piston against the central seating surface of the valve seat, and a spring is provided for biasing the piston in order to effect a regulated valve opening between the piston open end and the valve seat member.

23 Claims, 2 Drawing Sheets

FIRST STAGE PRESSURE REGULATOR WITH FLOW AROUND SEAT

The present invention is generally directed to first stage pressure regulators and is more particularly directed to a first stage pressure regulator having in-line connection capability with a high pressure source of breathable air.

In order to carry sufficient air for extended underwater excursions, SCUBA divers utilize a high pressure tank filled with gas which is typically at 3,000 psi or above.

The breathable gas, or air, is typically reduced in pressure by a first stage regulator to a constant intermediate pressure of about 140 psi. The first stage regulator is mounted directly on the high pressure tank and intermediate pressure is applied to a second stage regulator which, in turn, provides air to the diver at a usable pressure.

Hereinbefore, first stage pressure regulators have typically introduced high pressure air into the regulator at a right angle to the axis of the pressure regulator. This results in a cumbersome connection between the first stage regulator and the high pressure tank.

The present invention provides for a first stage pressure regulator capable of in-line connection with a high pressure source and further requires significantly fewer parts than conventional first stage regulators.

In addition, a unique seat design in accordance with the present invention provides for reversibility within the regulator which results in facilitating in field servicing of the regulator as will be hereinafter discussed in greater detail.

SUMMARY OF THE INVENTION

In accordance with the present invention, a first stage regulator for use with a high pressure source of breathable gas generally includes a housing and means for attaching the housing to a high pressure source of breathable gas, along with a pressure regulated outlet.

A valve seat member is provided which is fixed within the housing and has a central seating surface perpendicularly disposed to a longitudinal axis of the valve seat member.

Importantly, means are provided for enabling the breathable gas to pass parallel to the valve seat member longitudinal axis to the central seating surface. This feature enables the first stage pressure regulator to be connected to the high pressure source of breathable air in an "in-line" fashion. Further, the number of parts is substantially reduced and a more streamlined first stage pressure regulator results from this configuration.

In addition, the first stage pressure regulator, in accordance with the present invention, includes a piston having a hollow center in fluid communication with the pressure regulated outlet and open end means for sealing the piston against the central seating surface of a valve seat member. A spring provides means for biasing the piston in order to effect a regulated valve opening between the piston open end means and the valve seat member.

The means for enabling breathable gas to pass the valve seat member comprises a perimeter of the valve seat member with indentations, or irregularities, preferably being symmetrically disposed around the valve seat member perimeter.

In addition, the pressure regulator may include a valve seat member having two spaced apart and parallel central seating surfaces along with means, defining a symmetrical shape of the valve seat member, for enabling the valve seat member to be disposed within the housing in order that either one of the central seating surfaces is in a position for sealing against a piston open end means.

Importantly, this feature enables the pressure regulator, in accordance with the present invention, to provide for convenient in field reconfiguration. That is, if the seat, through use, on one side of the valve seat member does not properly seat with the piston means or open end, the valve seat member may simply be reversed, thereby utilizing the opposing seating surface.

In this regard, the valve seat member may include a solid central portion having central seating surfaces disposed on opposite ends and a plurality of spacer members, disposed around the solid central portion, and having a length greater than the length of the solid central portion.

In addition, in order to reduce the number of parts in the regulator, a unitary filter/seat retainer may be provided for both fixing a valve seat member within the housing and for filtering the high pressure breathable gas before the high pressure breathable gas passes parallel to the valve seat member.

BRIEF DESCRIPTION OF THE DRAWINGS

The advantages and features of the present invention will be better understood by the following description when considered in conjunction with the accompanying drawings in which.

DETAILED DESCRIPTION

Figure 1:
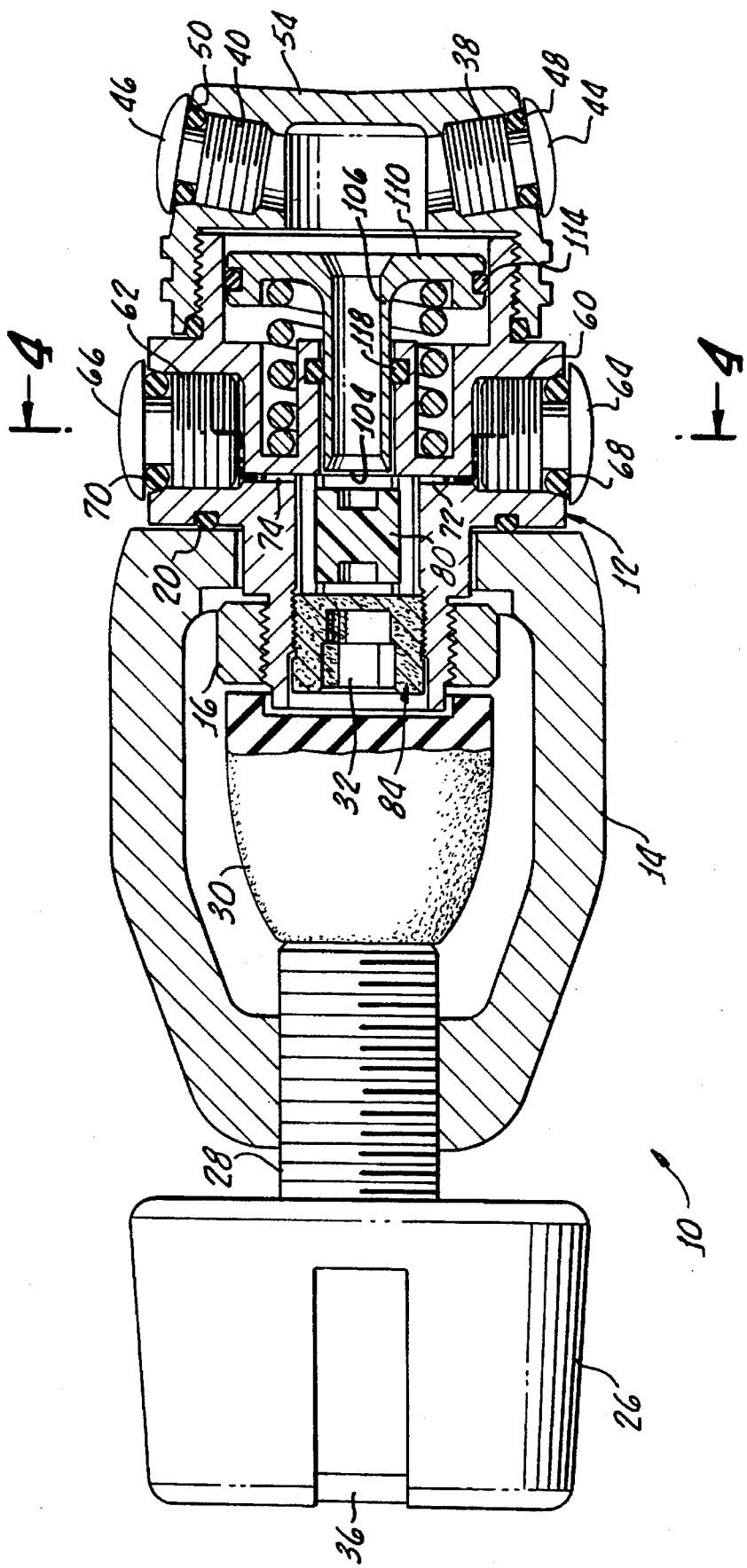
FIG. 1 is a cross-sectional view of the first stage pressure regulator in accordance with the present invention, generally showing a means for attaching a housing to a high pressure source of breathable gas which is coaxially aligned with a valve seat member.

Turning now to FIG. 1, there is generally shown a first stage pressure regulator 10 in accordance with the present invention having a housing, or body, 12 with a yoke 14 and a yoke retainer nut 16 threaded thereto which provides a means for attaching the housing 12 to a high pressure source (not shown). An O-ring 20 is provided between the yoke 14 and housing 12.

The yoke 14 configured as shown in FIG. 1 is a conventional design for U.S. standard supply tanks. Also, in accordance with a conventional design, a yoke knob 26 is connected to the yoke by means of threads 28, and a dust cover 30 is provided to prevent contamination around the entry to a high pressure inlet 32 when the regulator is not in use. An emblem 36, or the like, may be provided as indicia of the gas source.

Multiple pressure regulated outlets 38, 40 enable a plurality of second stage regulators (not shown) to be supplied with breathable air of intermediate pressure. As shown in FIG. 1, the outlets 38, 40 are sealed with plugs 44, 46 which seal the outlets 38, 40, utilizing O-rings 48, 50 to seal the outlets 38, 40 when not in use, i.e., not connected to a second stage regulator. As shown, the outlets 38, 40 are disposed in an end cap 54 attached to the housing, or body, 12.

Figure 2:
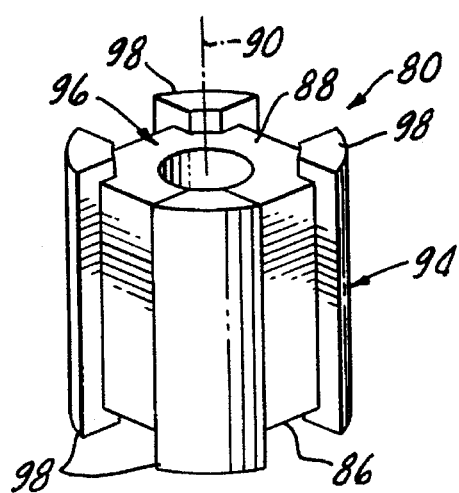
FIG. 2 is a perspective view of a valve seat member in accordance with the present invention.
Figure 3:
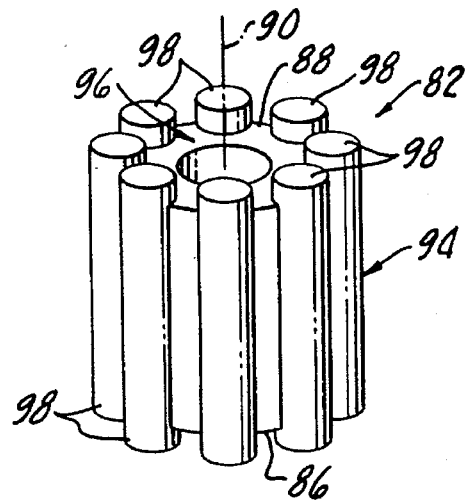
FIG. 3 is a perspective view of an alternative embodiment of a valve seat member in accordance with the present invention.

High pressure outlets 60, 62 may be provided for the attachment of gauges and the like (not shown). As shown in FIGS. 1 and 2, the high pressure outlets 60, 62 are sealed by plugs 64, 66 and O-rings 68, 70, when not in use. High pressure breathable gas is supplied to the outlet 60, 62 by way of small passages 72, 74. A valve seat member 80 or 82 (See FIGS. 4 and 5 respectively) is fixed within the housing 12 by a unitary filter/seat retainer 84 (See also FIG. 3).

Figure 4:
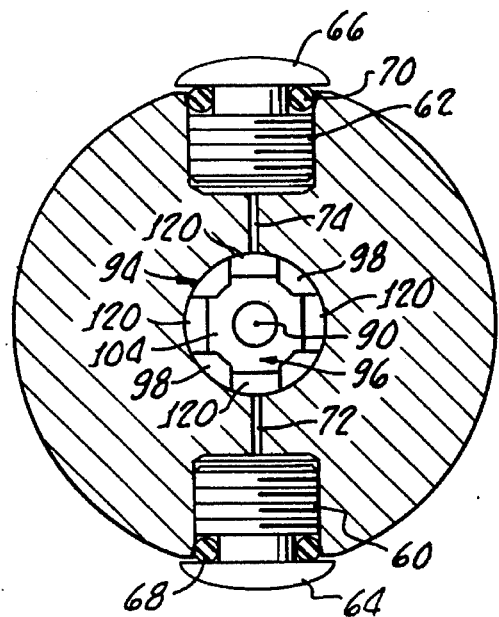
FIG. 4 is a cross-sectional view of a valve seat member as it is installed within the housing of the first stage pressure regulator taken along the line 4—4 in FIG. 1.
Figure 5:
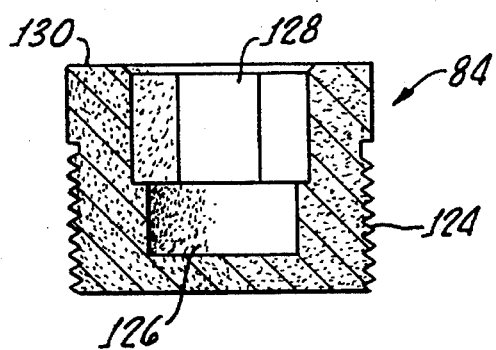
FIG. 5 is a cross-sectional view of a unitary filter/seat retainer in accordance with the present invention.

As more clearly shown in FIGS. 4 and 5, the valve seat member 80, 82 includes two central seating surfaces 86, 88 perpendicularly disposed to a longitudinal axis 90 of the valve seat member. Importantly, the valve seat 80, 82 includes a perimeter 94 which enables breathable gas to pass parallel to the valve seat member longitudinal axis 90 to either of the valve seat surfaces 86, 88, depending upon the orientation in which the valve seat 80, 82 is disposed within the housing.

In this regard, the valve seat 80, 82 includes a solid central portion 96 having the seating surfaces 86, 88 thereon with a plurality of spacer members 98 symmetrically disposed thereabout and having a length longer than a length of the solid central portion 96.

The symmetry of the valve seat 80, 82 enables its disposition within the housing 12 with either of the seating surfaces 86, 88 facing downwardly against an opened end 104 of a hollow piston 106. As hereinabove noted, this provides the advantage of in-field servicing of the first stage pressure regulator 10 in that the valve seat 80, 82 may be reversed as may be necessary in order to provide an alternative seating surface 86, 88, for the piston open end 104.

The piston 106 is in fluid communication with the pressure regulated outlets 38, 40 and a spring 110 provides a means for biasing the piston in order to effect a regulated valve opening between the piston open end 104 and the valve seat member 80, 82. An O-ring 114 along with an O-ring 118 are provided for sealing the piston within the housing 12.

As shown in FIG. 4, illustrating the valve seat 80, 82 disposed within the housing 12, the perimeter 94 of the valve seat 80, which includes the spacers 98. This irregularity provides for a plurality of air passages 120 for enabling breathable gas to pass parallel to the valve seat member axis 90 to the central seating surface 86.

As more clearly shown in FIG. 5, the unitary filter/seat retainer 84 includes a threaded exterior 124 for engagement with the housing 12 and a cavity 126 therein with a hex shape 128 on the top portion 130 for enabling rotation of the seat retainer 84 by a hex wrench (not shown) for securing the seat 80 within the housing 12, as shown in FIG. 1. The unitary filter/seat retainer 84 is formed from a porous material such as sintered bronze for the purpose of filtering high pressure breathable gas before the high pressure breathable gas passes parallel to the valve seat member.

Although there has been hereinabove described a first stage regulator in accordance with the present invention, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the present invention as defined in the appended claims.

What is claimed is:

1. A first stage pressure regulator for use with a high pressure source of breathable gas, said first stage pressure regulator comprising:

a housing having a longitudinal axis;

means for attaching said housing to a high pressure source of breathable gas;

a valve seat member having a length with a longitudinal axis and a central seating surface perpendicular to the valve seat longitudinal axis, said valve seat member being fixed within said housing with the central seating surface perpendicularly disposed to the housing longitudinal axis, said valve seat member having means for enabling said breathable gas to pass said valve seat member parallel to the valve seat member longitudinal axis to said central seating surface;

a piston having a hollow center in fluid communication with a pressure regulated outlet and open end means for sealing said piston against the central seating surface of the valve seat member; and spring means for biasing said piston in order to effect a regulated valve opening between the piston open end means and the valve seat member.

2. The first stage pressure regulator according to claim 1 wherein said means for enabling said breathable gas to pass comprises an irregular perimeter of the valve seat member.

3. The first stage pressure regulator according to claim 2 wherein said irregular perimeter comprises indentations symmetrically disposed around the valve seat member perimeter.

4. The first stage pressure regulator according to claim 1 wherein said valve seat member comprises two, spaced apart and parallel, central seating surfaces, and means, defining a symmetrical shape of the valve seat member, for enabling the valve seat member to be disposed within the housing in order that either one of the central seating surfaces is in a position for sealing against the piston open end means.

5. The first stage pressure regulator according to claim 4 wherein said means for enabling said breathable gas to pass comprises a notched perimeter of the valve seat member.

6. The first stage pressure regulator according to claim 5 wherein said notched perimeter comprises indentations symmetrically disposed around the valve seat perimeter.

7. The first stage pressure regulator according to claim 4 wherein each valve seat member further comprises a solid central portion having said central seating surface disposed on opposite ends thereof and a plurality of spacer members, disposed around said solid central portion, and having a length greater than a length of said solid central portion.

8. The first stage pressure regulator according to claim 7 wherein said solid central portion is centered between ends of the plurality of spacer members.

9. The first stage pressure regulator according to claim 8 further comprising a unitary filter/seat retainer means for both fixing said valve seat member within said housing and for filtering high pressure breathable gas before said high pressure breathable gas passes parallel to said valve seat member.

10. The first stage pressure regulator according to claim 9 further comprising a plurality of pressure regulated outlets in fluid communication with said piston.

11. The first stage pressure regulator according to claim 10 further comprising at least one high pressure outlet attached to said housing and in direct fluid communication with the high pressure source of breathable gas.

12. A first stage pressure regulator for use with a high pressure source of breathable gas, said first stage pressure regulator comprising:

a housing having a longitudinal axis;

means for attaching said housing to a high pressure source of breathable gas, for introducing the high pressure source of breathable gas in the housing along the housing longitudinal axis;

a pressure regulated outlet;

a valve seat member having a longitudinal axis, said valve seat member being coaxially fixed within said housing having a central seating surface perpendicularly disposed to the housing longitudinal axis and means for enabling said breathable gas to pass said valve seat member parallel to the housing longitudinal axis to said central seating surface;

a piston having a hollow center in fluid communication with said pressure regulated outlet and open end means for sealing said piston against the central seating surface of the valve seat member; and spring means for biasing said piston in order to effect a regulated valve opening between the piston open end means and the valve seat member.

13. The first stage pressure regulator according to claim 12 wherein said means for enabling said breathable gas to pass comprises an irregular perimeter of the valve seat member.

14. The first stage pressure regulator according to claim 13 wherein said irregular perimeter comprises indentations symmetrically disposed around the valve seat member perimeter.

15. The first stage pressure regulator according to claim 12 wherein said valve seat member comprises two, spaced apart and parallel, central seating surfaces, and means, defining a symmetrical shape of the valve seat member, for enabling the valve seat member to be disposed within the housing in order that either one of the central seating surfaces is in a position for sealing against the piston open end means.

16. The first stage pressure regulator according to claim 15 wherein said means for enabling said breathable gas to pass comprises a notched perimeter of the valve seat member.

17. The first stage pressure regulator according to claim 16 wherein said notched perimeter comprises indentations symmetrically disposed around the valve seat perimeter.

18. The first stage pressure regulator according to claim 15 wherein each valve seat member further comprises a solid central portion having said central seating surface disposed on opposite ends thereof and a plurality of spacer members, disposed around said solid central portion, and having a length greater than a length of said solid central portion.

19. The first stage pressure regulator according to claim 18 wherein said solid central portion is centered between ends of the plurality of spacer members.

20. The first stage pressure regulator according to claim 19 further comprising a unitary filter/seat retainer means for both fixing said valve seat member within said housing and for filtering high pressure breathable gas before said high pressure breathable gas passes parallel to said valve seat member.

21. The first stage pressure regulator according to claim 20 further comprising a plurality of pressure regulated outlets in fluid communication with said piston.

22. The first stage pressure regulator according to claim 21 further comprising at least one high pressure outlet attached to said housing and in direct fluid communication with the high pressure source of breathable gas.

23. A first stage pressure regulator for use with a high pressure source of breathable gas, said first stage pressure regulator comprising:

a housing having a longitudinal axis;

means for attaching said housing to a high pressure source of breathable gas;

a pressure regulated outlet;

a valve seat member having a length with a longitudinal axis and a central seating surface perpendicular to the valve set longitudinal axis, said valve seat member being fixed within said housing with the central seating surface perpendicularly disposed to the housing longitudinal axis, said valve seat member having means for enabling said breathable gas to pass said valve seat member parallel to said valve seat member longitudinal axis to said central seating surface;

unitary filter/seat retainer means for both fixing said valve seat member within said housing and for filtering high pressure breathable gas before said high pressure breathable gas passes parallel to said valve seat member;

a piston in fluid communication with said pressure regulated outlet and end means for sealing said piston against the central seating surface of the valve seat member; and spring means for biasing said piston in order to effect a regulated valve opening between the piston and the valve seat member.

* * * * *